United States Patent
Takenaka et al.

(10) Patent No.: US 7,652,085 B2
(45) Date of Patent: Jan. 26, 2010

(54) BIODEGRADABLE RESIN COMPOSITION

(75) Inventors: Akira Takenaka, Wakayama (JP); Shogo Nomoto, Wakayama (JP)

(73) Assignee: Kao Corporation, Tokyo (JP)

( * ) Notice: Subject to any disclaimer, the term of this patent is extended or adjusted under 35 U.S.C. 154(b) by 280 days.

(21) Appl. No.: 11/596,294

(22) PCT Filed: May 10, 2005

(86) PCT No.: PCT/JP2005/008843

§ 371 (c)(1), (2), (4) Date: Jan. 11, 2007

(87) PCT Pub. No.: WO2005/108501

PCT Pub. Date: Nov. 17, 2005

(65) Prior Publication Data

US 2008/0262150 A1 Oct. 23, 2008

(30) Foreign Application Priority Data

May 11, 2004 (JP) ............................. 2004-141414
Nov. 25, 2004 (JP) ............................. 2004-340416

(51) Int. Cl.
*C08K 5/103* (2006.01)

(52) U.S. Cl. ................... 524/317; 524/315; 524/308; 524/599; 524/236; 524/284; 523/124; 525/450

(58) Field of Classification Search ................... None
See application file for complete search history.

(56) References Cited

U.S. PATENT DOCUMENTS 6,235,825 B1 * 5/2001 Yoshida et al. ............... 524/314
6,417,294 B1 * 7/2002 Obuchi et al. ............... 525/450

FOREIGN PATENT DOCUMENTS

| EP | 1 491 523 A1 | 12/2004 |
| JP | 2002 146170 | 5/2002 |
| JP | 3410075 | 3/2003 |
| JP | 3411168 | 3/2003 |
| JP | 2004 345150 | 12/2004 |
| JP | 2005 133039 | 5/2005 |
| WO | WO 03/042302 A1 | 5/2003 |
| WO | 03 087031 | 10/2003 |

* cited by examiner

*Primary Examiner*—David Wu
*Assistant Examiner*—Vu Nguyen
(74) *Attorney, Agent, or Firm*—Oblon, Spivak, McClelland, Maier & Neustadt, L.L.P.

(57) ABSTRACT

The present invention relates to a method of producing a biodegradable resin composition, which includes step (1) of mixing a biodegradable resin, a plasticizer, and a crystal nucleating agent with one another at the melting point (Tm) of the biodegradable resin or more, wherein the crystal nucleating agent is an aliphatic compound having, in its molecule, two or more of at least one group selected from an ester group, a hydroxyl group and an amide group, and step (2) of thermally treating the resulting biodegradable resin composition at a temperature of from the glass transition temperature (Tg) to less than Tm of the composition, as well as a biodegradable resin composition, which contains a biodegradable resin, a plasticizer, and the above crystal nucleating agent, and which satisfies the following conditions: the haze thereof with a thickness of 0.5 mm after thermal treatment at 60° C. for 36 or 60 hours is 20% or less; the storage elastic modulus (E') at a temperature of 25° C. and a frequency of 50 Hz is $1 \times 10^8$ to $2 \times 10^9$ Pa; and the storage elastic modulus (E') at a temperature of 60° C. and a frequency of 50 Hz is $1 \times 10^7$ to $1 \times 10^9$ Pa.

7 Claims, No Drawings

BIODEGRADABLE RESIN COMPOSITION

TECHNICAL FIELD

The present invention relates to a biodegradable resin composition and a method of producing the same.

BACKGROUND OF THE INVENTION

General-purpose resins such as polyethylene, polypropylene, polyvinyl chloride and polystyrene produced from petroleum as the starting material have been used in various fields such as daily sundries, household appliances, automobile parts, building materials and food packaging, because they are lightweight and excellent in processability, physical properties and durability. However, the excellent durability of these resin products is problematic in disposal after fulfilling their roles and makes them inferior in degradation in the nature, and thus they can exert an adverse influence on the biological system.

To solve this problem, biodegradable polyester resins such as polylactic acid, lactic acid/other aliphatic hydroxycarboxylic acid copolymers, aliphatic polyesters derived from aliphatic polyvalent alcohols and aliphatic polyvalent carboxylic acids, and copolymers containing these units, have been developed as biodegradable polymers made of thermoplastic resin.

These biodegradable polymers, when placed in soil, seawater or an animal body, initiate degradation in a few weeks by the action of enzymes produced by microorganisms living in the nature and will disappear in about 1 year to several years. Their decomposed products are those nontoxic to humans, such as lactic acid, carbon dioxide, water etc. Among aliphatic polyesters, the polylactic acid-based resin is characterized in that it is produced inexpensively due to production of L-lactic acid in a large amount by fermentation from sugars obtained from potato, sweet potato, etc., its starting material is a natural crop from which the amount of total carbon oxides discharged is very small, and the performance of the resulting polymer is highly rigid and excellent in transparency, and thus the application of the polylactic acid-based resin is expected at present to be promising and is used in flat yarns, nets, horticultural materials, seedling pots etc. in the fields of agriculture and civil engineering, as well as in envelopes with a window, shopping bags, compost bags, writing materials, sundries etc. In the case of polylactic acid, however, its applicable field is limited to rigid moldings because of its brittleness, rigidity, and lack of pliability, and the polylactic acid when formed into a film is problematic due to insufficient flexibility and whitening on bending and is thus not used at present in the field of soft or semi-rigid products. As techniques of application to the field of soft and semi-rigid products, various methods which include adding plasticizers have been proposed. For example, techniques that include adding plasticizers such as tributyl acetyl citrate, diglycerin tetraacetate etc. have been disclosed. Polylactic acid when blended with these plasticizers can attain excellent flexibility upon extrusion molding etc. into a film or sheet; however, there is a problem that the polymer is in a noncrystal state, thus undergoing significant change in flexibility (temperature sensitivity) upon a change in temperature in the vicinity of glass transition point, and is poor in thermal resistance at high temperatures, thus changing physical properties depending on the season and cannot be used under a high-temperature environment. To solve this problem, a method of improving the thermal resistance etc. of polylactic acid, which includes adding a crystal nucleating agent such as talc to crystallize the polylactic acid is proposed (JP-B 3410075).

JP-B 3411168 discloses a method of producing an aliphatic polyester-molded product having both transparence and crystallizability, which includes molding an aliphatic polyester composition containing a transparent nucleating agent such as an aliphatic carboxylic acid amide having a melting point of 40 to 300° C. and then thermally treating it during or after molding.

WO-A 2003/042302 discloses a lactic acid-based polymer composition containing an amide compound having a specific structure, a plasticizer, and a lactic acid-based polymer, as well as a method of producing a molded product thereof.

SUMMARY OF THE INVENTION

The present invention provides a method of producing a biodegradable resin composition, which includes step (1) of mixing a biodegradable resin, a plasticizer, and a crystal nucleating agent with one another at the melting point (Tm) of the biodegradable resin or more, wherein the crystal nucleating agent is an aliphatic compound having, in its molecule, two or more of at least one group selected from an ester group, a hydroxyl group and an amide group, and step (2) of thermally treating the resulting biodegradable resin composition at a temperature from the glass transition temperature (Tg) to less than Tm of the composition.

The present invention also provides a biodegradable resin composition, which contains a biodegradable resin, a plasticizer, and a crystal nucleating agent, wherein the crystal nucleating agent is an aliphatic compound having, in its molecule, two or more of at least one group selected from an ester group, a hydroxyl group and an amide group and satisfies the following conditions (i), (ii) and (iii):

(i) the haze thereof with a thickness of 0.5 mm after thermal treatment at 60° C. for 36 or 60 hours is 20% or less;

(ii) the storage elastic modulus (E') at a temperature of 25° C. and a frequency of 50 Hz is $1\times10^8$ to $2\times10^9$ Pa; and (iii) the storage elastic modulus (E') at a temperature of 60° C. and a frequency of 50 Hz is $1\times10^7$ to $1\times10^9$ Pa.

DETAILED DESCRIPTION OF THE INVENTION

In JP-B 3410075 supra, however, there is a problem that the rate of crystallization by thermal treatment after molding is insufficient, and the transparency of the resulting sheet or film is deteriorated. In JP-B 3411168 supra, an aliphatic polyester-molded product which has flexibility and is excellent in the rate of crystallization and superior in transparency is still not obtained. In WO-A2003/042302 supra, the rate of crystallization of the lactic acid-based polymer composition is still not satisfactory.

The present invention relates to a biodegradable resin composition excellent in the rate of crystallization and excellent in heat sensitivity and thermal resistance, as well as a method of producing the same.

In the present invention described above, the thermal treatment at 60° C. for 36 or 60 hours in the condition (i) is a treatment condition enough to complete crystallization, and the transparency of the composition after the actual treatment reaches a predetermined value and does not change any more even if the thermal treatment is further continued, and thus the thermal treatment under the aforesaid condition is an indication of storage stability in transparency. The range of storage elastic modulus at 2° C. in (ii) shows the excellent flexibility of the biodegradable resin composition when used as a soft resin composition. The range of storage elastic modulus at 60° C. in (iii) shows that the heat sensitivity and thermal resistance of the biodegradable resin composition can be improved to the practical level by crystallization. Accordingly, it has been revealed that the biodegradable resin composition of the present invention satisfying all the conditions (i) to (iii) has solved the problems mentioned above.

According to the method of the present invention, the crystallization rate, heat sensitivity and thermal resistance of the biodegradable resin composition can be improved, and the biodegradable resin composition when used as transparent biodegradable resin can attain excellent transparency. The biodegradable resin composition of the present invention is excellent in the rate of crystallization and superior in heat sensitivity and thermal resistance, and upon application to transparent biodegradable resin, can maintain excellent transparency.

[Biodegradable Resin]

The biodegradable resin used in the present invention is preferably polyester resin having biodegradability based on JIS K6953 (ISO14855) "Test of Disintegration Degree and Aerobic and Extreme Biodegradation Degree under Controlled Aerobic Compost Conditions".

The biodegradable resin used in the present invention is not particularly limited as long as it has an ability to be biodegraded into low-molecular compounds by microorganisms in the nature. Examples of such biodegradable resin include aliphatic polyesters such as polyhydroxy butyrate, polycaprolactone, polybutylene succinate, polybutylene succinate/adipate, polyethylene succinate, polylactic acid resin, polymalic acid, polyglycolic acid, polydioxanone, poly(2-oxetanone) etc.; aliphatic aromatic copolyesters such as polybutylene succinate/terephthalate, polybutylene adipate/terephthalate, polytetramethylene adipate/terephthalate etc.; and mixtures of the above aliphatic polyesters or aliphatic aromatic copolyesters and naturally occurring polymers such as starch, cellulose, chitin, chitosan, gluten, gelatin, casein, soybean protein, collagen, keratin etc.

From the viewpoint of exhibiting the effect of the invention more significantly, the biodegradable resin is preferably transparent biodegradable resin. In the present invention, the transparent biodegradable resin refers to biodegradable resin having a haze of 20% or less in a thickness of 0.5 μm, and includes polylactic acid resin, polyglycolic acid, etc.

The haze of the biodegradable is a value determined by an integrating sphere light transmittance measuring device (haze meter) stipulated in JIS-K7105.

Among those described above, the polylactic resin is preferable from the viewpoint of processability, economical aspect, availability in a large amount, and physical properties. The polylactic acid resin is polylactic acid or a lactic acid/hydroxycarboxylic acid copolymer.

The hydroxycarboxylic acid includes glycolic acid, hydroxybutyric acid, hydroxyvaleric acid, hydroxypentanoic acid, hydroxycaproic acid, hydroxyheptanoic acid etc., among which glycolic acid and hydroxycaproic acid are preferable. The polylactic acid preferably has a molecular structure containing 20 to 100 mol % L- or D-lactic acid unit and 0 to 20 mol % of the corresponding lactic acid unit enantiomer. The lactic acid/hydroxycarboxylic acid copolymer is composed of 85 to 100 mol % L- or D-lactic acid unit and 0 to 15 mol % hydroxycarboxylic acid unit. The polylactic acid resin can be obtained by selecting a starting material having a necessary structure from L-lactic acid, D-lactic acid and hydroxycarboxylic acid and dehydrating polycondensation of the starting material. Preferably, the polylactic acid resin can be obtained by selecting a starting material having a necessary structure from a lactide that is a cyclic lactic acid dimer, a glycolide that is a cyclic glycolic acid dimer, caprolactone, etc., and subsequent ring-opening polymerization of the starting material. The lactide can occur as an L-lactide that is a cyclic L-lactic acid dimer, a D-lactide that is a cyclic D-lactic acid dimer, a meso-lactide that is a cyclic dimer of D-lactic acid and L-lactic acid, and a DL-lactide that is a racemic mixture of D-lactide and L-lactide. In the present invention, any lactides can be used. However, the main starting material is preferably D- or L-lactide.

Commercial biodegradable resins include, for example, Biomax® manufactured by DuPont. Ecoflex® manufactured by BASF, EasterBio® manufactured by Eastman Chemicals, Bionole® manufactured by Showa Highpolymer Co., Ltd., Matabee® manufactured by The Nippon Synthetic Chemical Industry Co., Ltd., Lacty® manufactured by Shimadzu Corporation, LACEA® manufactured by Mitsui Chemicals, Inc., Runale® manufactured by Nippon Shokubai Co., Ltd., Novon® manufacture by Chisso Corporation, Nature works® manufactured by Cargill Dow Polymers, etc.

Among those described above, polylactic acid resin is preferable, for example, LACEA® manufactured by Mitsui Chemicals, Inc. and Nature works® manufactured by Cargill Dow Polymers.

[Crystal Nucleating Agent]

From the viewpoint of the rate of crystallization, heat sensitivity, and transparency, the crystal nucleating agent used in the present invention is preferably an aliphatic compound having, in the molecule of the crystal nucleating agent, two or more of at least one group selected from an ester group, a hydroxyl group and an amide group, preferably an aliphatic compound having one or more hydroxyl groups and one or more ester or amide groups, more preferably an aliphatic compound having two or more hydroxyl groups and one or more ester or amide groups, still more preferably an aliphatic compound having two or more hydroxyl groups and two or more ester or amide groups. The melting point of the crystal nucleating agent is preferably 65° C. or more, more preferably in the range of from 70° C. to [melting point (Tm) of the biodegradable resin+50° C.], still more preferably in the range of from 80° C. to (Tm of the biodegradable resin+20° C.). Specifically, the melting point is preferably 70 to 220° C., more preferably 80 to 190° C. The reason that the effect of the invention is improved is not evident, and it is estimated that the compound is made excellent in interaction with the biodegradable resin when having the two or more functional groups described above, thereby improving compatibility therewith resulting in microscopic dispersion in the resin, and it is estimated that the compound is made excellent in dispersibility in the biodegradable resin by having one or more hydroxyl groups, preferably two or more hydroxyl groups, and made excellent in compatibility with the biodegradable resin by having one or more ester or amide groups preferably two or more ester or amide groups. When the melting point of the crystal nucleating agent is higher than the thermal treatment temperature and lower than the kneading temperature of the resin composition, the crystal nucleating agent is melted at the time of kneading thereby improving its dispersibility, and it is also preferable from the viewpoint of improvement of the rate of crystallization that the melting point of the crystal nucleating agent is higher than the thermal treatment temperature, because crystal nuclei can be stably formed and the thermal treatment temperature can be increased. A large number of microscopic crystals is precipitated rapidly in the cooling step from the preferable crystal nucleating agent in a resin molten state, which is preferable from the viewpoint of improvement of transparency and crystallization rate.

Preferably, the crystal nucleating agent used in the present invention contains a compound by which the cold crystallization temperature (Tcc) of the biodegradable resin composition, as defined below, can be made 65° C. or less or the melt crystallization temperature (Tmc) defined below can be made 100° C. or more.

<Cold Crystallization Temperature (Tcc)>

The cold crystallization temperature (Tcc) is defined as a peak temperature in cold crystallization determined by measuring, by a differential scanning calorimeter at increasing temperature at 8° C./min. from room temperature, a biodegradable resin composition obtained in a noncrystal state (that is, under such a condition that the degree of crystallization as determined by wide-angle X-ray diffraction becomes 1% or less) by cooling a mixture containing 100 parts by weight of a biodegradable resin, 15 parts by weight of polyoxyethylene (number of ethylene oxide units added on average: 6) glycerin triacetate (hereinafter abbreviated as POE (6) glycerin triacetate) as a plasticizer, and 1 part by weight of a crystal nucleating agent, at the melting point (Tm) of the biodegradable resin or more.

<Melt Crystallization Temperature (Tmc)>

The melt crystallization temperature (Tmc) is defined as a peak temperature in melt crystallization determined by measuring, by a differential scanning calorimeter at decreasing temperature at 5° C./min., a biodegradable resin composition in a molten state obtained by mixing 15 parts by weight of POE (6) glycerin triacetate as a plasticizer and 1 part by weight of a crystal nucleating agent with 100 parts by weight of a biodegradable resin.

The biodegradable resin used in measurement of cold crystallization temperature (Tcc) and melt crystallization temperature (Tmc) is preferably polylactic resin of 95% or more L-lactic acid purity, more preferably an L-lactic acid high-purity product of crystal grade, particularly LACEA H-400 (melting point Tm=166° C., MFR=3 (190° C., 2.16 kg)). Tm is a value determined from an endothermic peak in crystal melting by a heating method in differential scanning calorimetry (DSC) based on JIS-K7121.

As the plasticizer used in measurement of cold crystallization temperature (Tcc) and melt crystallization temperature (Tmc), POE (6) glycerin triacetate synthesized in Synthesis Example 1 is used.

In a specific method of measuring the cold crystallization temperature (Tcc) and melt crystallization temperature (Tmc), a composition containing 100 parts by weight of polylactic acid resin (for example, LACEA H-400 manufactured by Mitsui Chemicals, Inc.), 15 parts by weight of POE (6) glycerin triacetate and part by weight of a crystal nucleating agent is kneaded in a Laboplasto Mill (manufactured by Toyo Seiki Seisaku-sho, Ltd.) at 180° C. for 10 minutes and then formed into a test piece of 0.5 mm in thickness by a press molding machine at 180° C. In press molding, a sheet molded is cooled in a noncrystal state (that is, under such a condition that the degree of crystallization as determined by wide-angle X-ray diffraction becomes 1% or less). The sheet is cut into fine pieces, and then 15 mg of the pieces are weighed out on an aluminum pan and measured at increasing temperature at 8° C./min. from room temperature to 200° C. in a differential scanning calorimeter (DSC). In this measurement, an exothermic peak in cold crystallization is observed, and its peak temperature is determined as cold crystallization temperature (Tcc). Then, the sample is measured at decreasing temperature at 5° C./min. from 200° C. to room temperature. In this measurement, an exothermic peak in melt crystallization is observed, and its peak temperature is determined as melt crystallization temperature (Tmc).

The compound by which the cold crystallization temperature (Tcc) defined in the present invention can be made 65° C. or less is a compound which upon addition to the biodegradable resin containing a plasticizer, is considered to have an ability to form a large number of microscopic crystal nuclei and a crystal interface (surface area) during a period of from a noncrystal state after molding (that is, under such a condition that the degree of crystallization as determined by wide-angle X-ray diffraction becomes 1% or less) to crystallization by thermal treatment, and upon thermal treatment, many such microscopic crystal nuclei and the crystal interface (surface area) are considered to act for accelerating crystallization and formation of microscopic crystals, resulting in exhibiting the effect of the invention.

The present inventors found that there is a definite correlation among the cold crystallization temperature (Tcc) defined above, the degree of crystallization and formation of microcrystals, as parameters indicative of the performance of the crystal nucleating agent including organic and inorganic compounds. When the cold crystallization temperature (Tcc) is 65° C. or less, preferably 63° C. or less, the crystallization rate of the plasticizer-containing biodegradable resin composition is significantly improved, thus achieving improvement in processability, reduction in costs, improvement in heat sensitivity and thermal resistance and rendering crystals finer, thereby allowing transparent biodegradable resin such as polylactic acid to maintain excellent transparency.

Further, the present inventors found that when the plasticizer-containing biodegradable resin composition is crystallized by cooling the polymer in a molten state, there is a definite correlation between the melt crystallization temperature (Tmc) defined above and the rate of crystallization as parameters indicative of the performance of the crystal nucleating agent, and upon addition of the crystal nucleating agent having a Tmc of 100° C. or more, preferably 105° C. or more, the crystallization rate of the plasticizer-containing biodegradable resin composition is significantly improved thus achieving improvement in processability, reduction in costs, and improvement in heat sensitivity and thermal resistance and significantly improving impact resistance for an injection molded product.

From the viewpoint of crystallization rate, thermal resistance, heat sensitivity, and transparency, the solubility parameter (SP value, $(MPa)^{1/2}$) of the crystal nucleating agent of the present invention is preferably in the range of (biodegradable resin's SP value−2) to (biodegradable resin's SP value+1), more preferably in the range of (biodegradable resin's SP value−1.8) to (biodegradable resin's SP value+0.8), still more preferably in the range of (biodegradable resin's SP value−1.6) to (biodegradable resin's SP value+0.6), further more preferably in the range of (biodegradable resin's SP value−1.4) to (biodegradable resin's SP value+0.4). This is because when the solubility parameter of the crystal nucleating agent of the present invention is near to the SP value of the resin, the crystal nucleating agent would be finely dispersed upon kneading, to contribute to formation of a large number of microscopic crystal nuclei and a crystal growth interface (surface area).

The crystal nucleating agent of the present invention includes aliphatic esters, aliphatic amides, and aliphatic acid metal salts, and the aliphatic esters include aliphatic acid esters such as stearic acid monoglyceride, behenic acid monoglyceride etc. and hydroxy aliphatic acid esters such as 12-hydroxystearic acid triglyceride etc.; the aliphatic amides include hydroxy aliphatic acid monoamides such as 12-hydroxystearic acid monoethanol amide and aliphatic bisamides such as ethylenebislauric acid amide, ethylenebiscapric acid amide, ethylenebiscaprylic acid amide, etc. and hydroxy aliphatic acid bisamides such as ethylenebis-12-hydroxystearic acid amide, hexamethylenebis-12-hydroxystearic acid amide, etc.; and the aliphatic acid metal salts include hydroxyaliphatic acid metal salts such as calcium 12-hydroxystearate. From the viewpoint of crystallization rate, thermal resistance, heat sensitivity and transparency, 12-hydroxystearic acid triglyceride, behenic acid monoglyceride, ethylenebis-12-hydroxystearic acid amide, hexamethylenebis-12-hydroxystearic acid amide, 12-hydroxystearic acid monoethanolamide, ethylenebiscaprylic acid amide and ethylenebiscapric acid amide are preferable; 12-hydroxystearic acid triglyceride, ethylenebis-12-hydroxystearic acid amide, hexamethylenebis-12-hydroxystearic acid amide and 12-hydroxystearic acid monoethanolamide are more preferable; 12-hydroxystearic acid triglyceride, ethylenebis-12-hydroxystearic acid amide, and hexamethylenebis-12-hydroxystearic acid amide are still more preferable; and ethylenebis-12-hydroxystearic acid amide and hexamethylenebis-12-hydroxystearic acid amide are further more preferable.

The crystal nucleating agent of the present invention, when added to transparent biodegradable resin such as polylactic resin, can maintain excellent transparency.

It is considered that the crystal nucleating agent of the present invention, when added to a plasticizer-containing biodegradable resin, has an ability to form a large number of microscopic crystal nuclei and a crystal-growing interface (surface area) during a period of from a noncrystal state after molding (that is, under such a condition that the degree of crystallization as determined by wide-angle X-ray diffraction becomes 1% or less) to crystallization by thermal treatment. It is accordingly considered that, when the temperature is increased from the temperature of the crystal nucleating agent in a noncrystal state, the cold crystallization enthalpy measured is decreased as the number of microscopic crystal nuclei formed is increased.

As a result, the difference in absolute value between the crystal melt enthalpy and cold crystallization enthalpy is estimated to be increased. The difference in absolute value ($|\Delta Hm|-|\Delta Hcc|$) between the crystal melt enthalpy $\Delta Hm$ and the cold crystallization enthalpy $\Delta Hcc$, measured by DSC at increasing temperature at 8° C./min. from room temperature to Tm+20° C., is preferably 25 J/g or more, more preferably 28 J/g or more.

[Plasticizer]

The plasticizer used in the present invention is not particularly limited, and examples thereof include not only plasticizers used in general biodegradable resin but also plasticizers shown in the following (1) to (12):

(1) An ester of the following components (a) and (b):
(a) at least one member selected from a hydroxyl aromatic carboxylic acid represented by the following general formula (I):

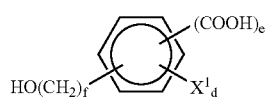

(I)

(wherein $X^1$ represents a hydrogen atom, a hydroxyl group, a C1 to C22 alkyl group, an alkenyl or alkoxy group, or a halogen atom, each of d and e is an integer of 1 or more, d+e=5, f is an integer of 0 to 3, and $X^1$s whose number is d may be the same or different), a hydroxyl condensed polycyclic aromatic carboxylic acid having one or more hydroxyl groups and carboxyl groups in one molecule, a hydroxyl alicyclic carboxylic acid, an anhydride thereof, and a C1 to C3 lower alkyl ester thereof; and (b) at least one member selected from the group consisting of a hydroxyl compound selected from an aliphatic alcohol, an alicyclic alcohol, an aromatic alcohol, phenol and an alkyl phenol, or at least one member selected from alkylene oxide adducts (number of carbon atoms in the alkylene group is 2 to 4, and the number of alkylene oxide units added on average is from 0 (exclusive) to 30) of the hydroxyl compound.

(2) An ester of the following components (c) and (d):
(c) at least one member selected from an aromatic carboxylic acid represented by the following general formula (II):

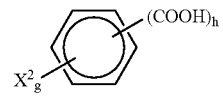

(II)

(wherein $X^2$ represents a hydrogen atom, a methyl group or a halogen atom, each of g and h is an integer of 1 or more, g+h=6, and $X^2$s whose number is g may be the same or different), a condensed polycyclic aromatic carboxylic acid having one or more carboxyl groups in one molecule, an alicyclic carboxylic acid, an anhydride thereof, and a C1 to C3 lower alkyl ester thereof; and (d) at least one member selected from alkylene oxide adducts (number of carbon atoms in the alkylene group is 2 to 4, and the number of alkylene oxide units added on average is from 0 to 30) of a monohydroxy compound selected from an aliphatic monoalcohol, an alicyclic monoalcohol, an aromatic monoalcohol, phenol, and an alkyl phenol.

(3) An N-alkylated compound (number of carbon atoms in the alkyl group is 1 to 22) of an aromatic sulfone amide.

(4) An ester of the following components (e) and (f):
(e) at least one member selected from an aromatic monocarboxylic acid represented by the following general formula (III):

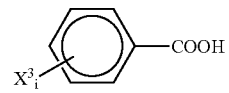

(III)

(wherein $X^3$ represents a hydrogen atom, a C1 to C22 alkyl group, an alkenyl or alkoxy group, or a halogen atom, i is an integer of 1 to 5, and $X^3$s whose number is i may be the same or different), a C1 to C22 linear or branched aliphatic monocarboxylic acid, a condensed polycyclic aromatic monocarboxylic acid, an alicyclic monocarboxylic acid, and a lower alkyl ester (number of carbon atoms in the alkyl group: 1 to 3) of the monocarboxylic acid, and (f) at least one member selected from alkylene oxide adducts (number of carbon atoms in the alkylene group is 2 to 4, and the number of alkylene oxide units added on average per hydroxyl group is 0 [exclusive] to 10) of a hydroxy compound selected from an aliphatic divalent alcohol represented by the following general formula (IV):

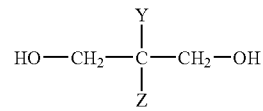

(IV)

(wherein Y and Z each represent a C1 to C8 alkyl or alkenyl group, and may be the same or different), a C3 to C30 polyvalent alcohol having 3 or more hydroxyl groups in one molecule, and an aliphatic diol having 2 hydroxyl or methylol groups in one molecule.

(5) An aliphatic dicarboxylic acid polyoxyalkylene alkyl ether ester, a polyalkylene glycol aliphatic acid ester, or an aliphatic polyvalent alcohol/benzoic acid ester.

(6) An ester of the following components (g) and (h):
(g) a polycarbonate diol containing a repeating structural unit represented by the general formula (V) (referred to hereinafter as structural unit (V)):

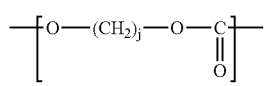 (V)

(wherein j is an integer of 2 to 6) and having hydroxyl groups at both ends, and
(h) at least one member selected from an aromatic monocarboxylic acid represented by the general formula (VI):

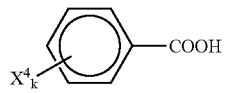 (VI)

(wherein $X^4$ represents a hydrogen atom, a hydroxyl group, a C1 to C22 linear or branched alkyl group, an alkenyl or alkoxy group, or a halogen atom, k is an integer of 1 to 5, and $X^4$s whose number is k may be the same or different), a condensed polycyclic aromatic monocarboxylic acid, an aliphatic monocarboxylic acid, a hydroxy condensed polycyclic aromatic monocarboxylic acid having one or more hydroxyl groups in one molecule, a hydroxy alicyclic monocarboxylic acid, an anhydride thereof, and a C1 to C3 lower alkyl ester.
(7) An ester of the following components (i) and (j):
(i) at least one member selected from a carboxylic acid having at least one cyano group, an anhydride thereof, and a C1 to C3 lower alkyl ester thereof, and
(j) a hydroxy compound selected from an aliphatic alcohol, an alicyclic alcohol, an aromatic alcohol, phenol and an alkyl phenol or at least one member selected from alkylene oxide adducts (number of carbon atoms in the alkylene group is 2 to 4, and the number of alkylene oxide units added on average is 0 [exclusive] to 30) of the hydroxy compound.
(8) An ester of the following components (k) and (l):
(k) at least one member selected from alkylene oxide adducts of C3 or more polyvalent alcohol having 3 or more hydroxyl groups in one molecule, and
(l) at least one member selected from a C2 to C12 linear or branched aliphatic acid and a C1 to C3 lower alkyl ester thereof.
(9) A cyclic acetal obtained by acetalation reaction or transacetalation reaction of the following component (m) with the following component (n):
(m) at least one member of trivalent or more polyvalent alcohols, and
(n) at least one member selected from a carbonyl compound represented by the general formula (VII):

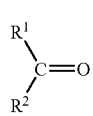 (VII)

(wherein $R^1$ and $R^2$ are the same or different and each represent a hydrogen atom or a C1 to C21 linear, branched or cyclic alkyl group, and $R^1$ and $R^2$ may be combined with each other to form a C2 to C24 alkylene group) and an acetal obtained from the carbonyl compound and a C1 to C6 lower alcohol.
(10) A compound represented by the general formula (VIII):

$$R^{11}O(AO)_nR^{12} \quad (VIII)$$

wherein $R^{11}$ represents a C1 to C15 linear or branched alkyl group, an alkenyl group or a C7 to C18 alkylphenyl group, $R^{12}$ represents a C2 to C15 acyl group, an alkyl group or an alkenyl group, the total number of carbon atoms in $R^{11}$ and $R^{12}$ is 4 to 18, A is a C2 to C4 alkylene group, n is a number of 1 to 20 indicative of the number of alkylene oxide units added on average, and A's whose number is n may be the same or different.
(11) An ester containing at least one alcohol component selected from alkylene oxide adducts of monovalent or divalent alcohol and at least one acid component selected from a trivalent or more aliphatic polyvalent carboxylic acid, a trivalent or more aromatic polyvalent carboxylic acid, a condensed polycyclic aromatic carboxylic acid, an alicyclic carboxylic acid, anhydrides thereof and C1 to C3 lower alkyl esters thereof.
(12) A compound represented by the general formula (IX):

$$B—[O(EO)_s—R^{13}]_2 \quad (IX)$$

wherein B represents a residue of a C2 to C8 linear or branched divalent alcohol from which two hydroxyl groups were removed, $R^{13}$ represents a C2 to C6 linear or branched acyl group, two $R^{13}$ groups may be the same or different, EO is an oxyethylene group, s is the number of ethylene oxide groups added on average and is a number satisfying the relationship: $3 \leq 2s \leq 20$.

Among these plasticizers used in the present invention, mention is made of hydroxy benzoates such as 2-ethylhexyl hydroxy benzoate, polyvalent alcohol esters such as glycerin ethylene oxide-added acetate, phthalates such as di-2-ethylhexyl phthalate, adipates such as dioctyl adipate, maleates such as di-n-butyl maleate, citrates such as tributyl acetylcitrate, alkyl phosphates such as tricresyl phosphate, an ester of succinic acid and triethylene glycol monomethyl ether, an ester of adipic acid and diethylene glycol monomethyl ether, tricarboxylic acid esters such as trioctyl trimellitate, polyvalent carboxylic acid alkyl ether esters such as an ester of 1,3,6-hexatricarboxylic acid and butyl diglycol, acetylated polyoxyethylene alkyl (number of carbon atoms in the alkyl group: 2 to 15) ethers such as acetylated polyoxyethylene hexyl ether, a polyethylene glycol diacetate to which 3 to 20 ethylene oxide units were added, polyethylene 1,4-butanediol ether diacetate, etc. Among those described above, hydroxy benzoates such as 2-ethylhexyl hydroxy benzoate, polyvalent alcohol esters such as glycerin ethylene oxide-added acetate and polyethylene glycol diacetate to which 3 to 20 ethylene oxide units were added, phthalates such as diethyl phthalate, (poly)glycerin esters such as acetylated monoglyceride and diglycerin tetraacetate, citrates such as tributyl acetylcitrate, alkyl phosphates such as tricresyl phosphate, an ester of succinic acid and triethylene glycol monomethyl ether, an ester of adipic acid and diethylene glycol monomethyl ether, and polyvalent carboxylic acid alkyl ether esters such as an ester of 1,3,6-hexatricarboxylic acid and butyl diglycol are preferable from the viewpoint of excellent flexibility and transparency of the biodegradable resin. Polyvalent alcohol esters such as glycerin ethylene oxide-added acetate, a polyethylene glycol diacetate to which 3 to 10 ethylene oxide units were added, and polyvalent carboxylic acid alkyl ether esters such as an ester of succinic acid and triethylene glycol monomethyl ether, an ester of adipic acid and diethylene glycol monomethyl ether, and an ester of 1,3,6-hexatricarboxylic acid and butyl diglycol are preferable from the viewpoint of excellent flexibility, transparency and crystallization rate. An acetate to which 3 to 6 glycerin ethylene oxide units were added, a polyethylene glycol diacetate to which 5 to 10 ethylene oxide units were added, an ester of succinic acid and triethylene glycol monomethyl ether, and an ester of adipic acid and diethylene glycol monomethyl ether are more preferable from the viewpoint of excellent flexibility, transparency, crystallization rate and resistance to bleeding. An ester of succinic acid and triethylene glycol monomethyl ether is particularly preferable from the viewpoint of flexibility, transparency, crystallization rate, resistance to bleeding, excellent biodegradability and resistance to irritating smell.

[Biodegradable Resin Composition]

The biodegradable resin composition of the present invention satisfies the above conditions (i), (ii) and (iii), wherein (i) the haze thereof with a thickness of 0.5 mm after thermal treatment at 60° C. for 36 or 60 hours is preferably 15% or less, more preferably 10% or less; (ii) the storage elastic modulus (E') at a temperature of 25° C. and a frequency of 50 Hz is preferably $1\times10^8$ to $1.5\times10^9$ Pa; and (iii) the storage elastic modulus (E') at a temperature of 60° C. and a frequency of 50 Hz is preferably $2\times10^7$ to $1\times0^9$ Pa. The haze and storage elastic modulus (E') of the biodegradable resin composition are values determined by measurement methods described in the Examples.

When highly transparent biodegradable resin is used in the biodegradable resin composition of the present invention, the biodegradable resin composition having excellent transparency in addition to the effect of the invention described above can be obtained.

From the viewpoint of improving the crystallization rate, heat sensitivity, thermal resistance and transparency, the combination of the biodegradable resin, the plasticizer and the crystal nucleating agent in the biodegradable resin composition of the present invention is preferably as follows: The biodegradable resin is preferably polylactic acid resin, the plasticizer is polyoxyethylene methyl ether succinic acid diester (more preferably, a diester of succinic acid and triethylene glycol monomethyl ether), polyoxyethylene methyl ether adipic acid diester (diester of adipic acid and diethylene glycol monomethyl ether), acetate to which glycerin ethylene oxide units were added (more preferably, POE (6) glycerin triacetate), polyethylene glycol diacetate to which 3 to 10 ethylene oxide units were added (more preferably polyethylene glycol diacetate to which 5 to 10 ethylene oxide units were added), the crystal nucleating agent is preferably an aliphatic compound having two or more hydroxyl groups and two or more ester or amide groups (more preferably at least one member selected from ethylenebis-12-hydroxystearic acid amide and hexamethylenebis-12-hydroxystearic acid amide), and it is particularly preferable that the biodegradable resin is polylactic acid, the plasticizer is a diester of succinic acid and triethylene glycol monomethyl ether, and the crystal nucleating agent is at least one member selected from ethylenebis-12-hydroxystearic acid amide and hexamethylenebis-12-hydroxystearic acid amide.

Even if either the plasticizer or the crystal nucleating agent is added to the biodegradable resin, particularly polylactic resin, the effect of the invention cannot be obtained, and the problem cannot be solved. Crystallization of the polymer proceeds at 2 stages, that is, formation of polymer crystal nuclei and diffusion of polymer segments. From the viewpoint of improving the crystallization rate, the crystal nucleating agent is melted to improve dispersibility when the resin is in a molten state, and upon cooling, the crystal nucleating agent can instantly form a large number of microscopic crystals of the crystal nucleating agent, resulting in promoting the formation of polymer crystal nuclei and in a significant effect of increasing the number of crystal nuclei. However, even if polymer crystal nuclei are formed, the rate of crystallization is not satisfactory in the case the rate of diffusion of polymer segments is low. For improving the rate of diffusion of the polymer, the temperature may be increased; however, this increase in the temperature is not preferable because the polymer crystal nuclei are made unstable. The plasticizer has a significant effect of improving the rate of crystallization of the polymer and can thus achieve a sufficient rate of crystallization even at low temperatures of 50 to 85° C. This effect can be realized for the first time by combining the crystal nucleating agent with the plasticizer. For attaining a sufficient rate of crystallization and impact resistance in the present invention, the amount of the plasticizer added is preferably 7 parts by weight or more based on 100 parts by weight of the biodegradable resin, and 7 parts by weight or more are preferable from the viewpoint of impact resistance as well.

From the viewpoint of maintaining transparency, the above-mentioned combination of the crystal nucleating agent and the plasticizer is preferable. For improving transparency, uniform growth of crystals from a large number of polymer crystal nuclei brings about microscopic crystals to increase transparency, and the above crystal nucleating agent capable of forming a large number of crystals is preferable. As described above, crystallization at high temperatures makes polymer crystal nuclei instable, and thus it is preferable from the viewpoint of maintaining transparency that the plasticizer having a significant effect of improving the rate of crystallization of the polymer is added in an amount of 7 parts by weight or more based on 100 parts by weight of the biodegradable resin, and the polymer is crystallized at low temperatures of 50 to 85° C.

The biodegradable resin composition of the present invention contains the plasticizer and the crystal nucleating agent, and the content of the plasticizer is preferably 7 to 70 parts by weight, more preferably 10 to 70 parts by weight, still more preferably 10 to 50 parts by weight, further more preferably 15 to 45 parts by weight, based on 100 parts by weight of the biodegradable resin. The content of the crystal nucleating agent is preferably 0.1 to 5 parts by weight, more preferably 0.3 to 5 parts by weight, still more preferably 0.5 to 3 parts by weight, based on 100 parts by weight of the biodegradable resin.

Preferable values etc. are shown above, and depending on applications and processing methods of the resin composition, there are preferable combinations. The storage elastic modulus (E') of the biodegradable resin composition of the present invention, when used as an injection molded product, is preferably $1\times10^9$ to $2.0\times10^9$ Pa, more preferably $1.5\times10^9$ to $2\times10^9$ Pa, at the temperature of 25° C. and the frequency of 50 Hz in the above-mentioned (ii). The storage elastic modulus (E') at the temperature of 60° C. and the frequency of 50 Hz in the above-mentioned (iii) is preferably $1\times10^8$ to $1\times10^9$ Pa, more preferably $2\times10^8$ to $1\times10^9$ Pa. The storage elastic modulus (E') of the biodegradable resin composition of the present invention, when used as a sheet or film having flexibility comparative to that of polypropylene, is preferably $1\times10^9$ to $2.0\times10^9$ Pa, more preferably $1.2\times10^9$ to $1.8\times10^9$ Pa, at the temperature of 25° C. and the frequency of 50 Hz in the above-mentioned (ii). The storage elastic modulus (E') at the temperature of 60° C. and the frequency of 50 Hz in the above-mentioned (iii) is preferably $1\times10^8$ to $1\times10^9$ Pa, more preferably $2\times10^8$ to $1\times10^9$ Pa.

In application to the above 2 examples, the content of the plasticizer is preferably 7 to 30 parts by weight, more preferably 10 to 25 parts by weight, still more preferably 10 to 20 parts by weight, based on 100 parts by weight of the biodegradable resin.

In application to the above 2 examples, the biodegradable resin of the present invention is preferably transparent biodegradable resin, more preferably polylactic acid resin, from the viewpoint of sufficiently exhibiting the effect of the invention. From the viewpoint of the rate of crystallization and physical properties, the biodegradable resin is preferably a high-purity L-lactic acid product of crystal grade, particularly preferably LACEA H-400, LACEA H-100 or LACEA H-440 manufactured by Mitsui Chemicals, Inc., more preferably polylactic resin of 95% or more L-lactic acid purity, particularly preferably LACEA H-400 or LACEA H-100 manufactured by Mitsui Chemicals, Inc.

The biodegradable resin composition of the present invention, when used as a sheet or film being so flexible as polyethylene or soft polyvinyl chloride (containing, as the plasticizer, dioctyl phthalate in an amount of 40 to 70 parts by weight based on 100 parts by weight of the resin), is preferably $1 \times 10^8$ to $1 \times 10^9$ Pa, more preferably $2 \times 10^8$ to $1 \times 10^9$ Pa, at the temperature of 25° C. and the frequency of 50 Hz in the above-mentioned (ii). The storage elastic modulus (E') at the temperature of 60° C. and the frequency of 50 Hz in the above-mentioned (iii) is preferably $1 \times 10^7$ to $1 \times 10^8$ Pa, more preferably $2 \times 10^7$ to $1 \times 10^8$ Pa.

In the application described above, the content of the plasticizer is preferably 15 to 50 parts by weight, more preferably 20 to 40 parts by weight, still more preferably 20 to 30 parts by weight, based on 100 parts by weight of the biodegradable resin.

In the application described above, the biodegradable resin of the present invention is preferably transparent biodegradable resin, more preferably polylactic acid resin, from the viewpoint of sufficiently exhibiting the effect of the invention. From the viewpoint of physical properties inter alia, the biodegradable resin is preferably a blend containing a high-purity L-lactic acid product of crystal grade and a low-purity L-lactic acid product of noncrystal grade, particularly preferably a blend containing LACEA H-400 or LACEA H-100 (Mitsui Chemicals, Inc.) as 95% or more L-lactic acid purity of crystal grade and LACEA H-280 (Mitsui Chemicals, Inc.) as 90% or less L-lactic acid purity product of noncrystal grade. Alternatively, LACEA H-440 manufactured by Mitsui Chemicals, Inc. may be used alone or may be blended with the product of noncrystal grade. From the viewpoint of the rate of crystallization, the compounding ratio of (95% or more L-lactic acid purity product of crystal grade)/(90% or less L-lactic acid purity product of noncrystal grade) is preferably 95/5 to 20/80 (ratio by mass), more preferably 90/10 to 20/80, still more preferably 80/20 to 25/75, further more preferably 75/25 to 25/75.

The difference [$Tg^1-Tg^2$] between the glass transition point ($Tg^1$) of the biodegradable resin and the glass transition point ($Tg^2$) of the biodegradable resin composition of the present invention is preferably in the range of 10 to 80° C., more preferably 15 to 70° C., still more preferably 20 to 60° C.

The degree of crystallization of the biodegradable resin composition of the present invention cannot be generalized because the degree of crystallization varies depending on the type of the biodegradable resin, the presence or absence of the plasticizer, etc., but from the viewpoint of exhibiting the effect of the invention, the degree of crystallization is preferably 5 to 50% more preferably 10 to 40%. The degree of crystallization of the biodegradable resin composition of the present invention is a value determined by a measurement method described in the Examples.

The biodegradable resin composition of the present invention can contain other ingredients such as a hydrolysis inhibitor, an antioxidant and a lubricant in addition to the crystal nucleating agent and the plasticizer. The hydrolysis inhibitor includes carbodiimide compounds such as polycarbodiimide compounds including polycarbodiimide compounds obtained by reacting a monocarbodiimide such as dicyclohexyl carbodiimide or diisopropyl carbodiimide with an organic diisocyanate. The content of the hydrolysis inhibitor is preferably 0.05 to 3 parts by weight, more preferably 0.1 to 2 parts by weight, based on 100 parts by weight of the biodegradable resin. The antioxidant includes hindered phenol- or phosphite-based antioxidants. The content of the antioxidant is preferably 0.05 to 3 parts by weight, more preferably 0.1 to 2 parts by weight, based on 100 parts by weight of the biodegradable resin. The lubricant includes, for example, hydrocarbon-based wax such as polyethylene wax, aliphatic acids such as stearic acid, aliphatic acid esters such as glycerol ester, metal soap such as calcium stearate, ester wax such as montanic acid wax, anionic surfactants having an aromatic ring, such as alkylbenzene sulfonate, and anionic surfactants having alkylene oxide units added thereto, such as polyoxyethylene alkyl ether sulfate. The content of the lubricant is preferably 0.05 to 3 parts by weight, more preferably 0.1 to 2 parts by weight, based on 100 parts by weight of the biodegradable resin.

The biodegradable resin composition of the present invention can contain an antistatic agent, an anti-fogging agent, a light stabilizer, a UV light absorber, a pigment, an inorganic filler, an anti-fungus agent, an antimicrobial agent, a foaming agent and a flame retardant as ingredients other than those described above in such a range that the object of the invention is not hindered.

The biodegradable resin composition of the present invention is excellent in processability and can be processed for example at low temperatures of 130 to 200° C., is thus advantageous in rendering the plasticizer hardly degradable, and can be used for various applications by molding it into a film or sheet.

[Method of Producing the Biodegradable Resin Composition]

The method of producing the biodegradable resin composition according to the present invention includes step (1) of mixing a biodegradable resin, a plasticizer and the crystal nucleating agent of the present invention with one another at the melting point (Tm) of the biodegradable resin or more, and step (2) of thermally treating the resulting biodegradable resin composition at a temperature of from the glass transition temperature (Tg) to less than Tm of the composition.

It is preferable that after the step (1) is finished, the mixture is cooled and made noncrystal (that is, under such a condition that the degree of crystallization as determined by wide-angle X-ray diffraction becomes 1% or less) and then the step (2) is conducted, or that after the step (1) is finished, the mixture is cooled and immediately subjected to the step (2), and from the viewpoint of exhibiting the rate of crystallization in the present invention, it is more preferable that after the step (1) is finished, the mixture is cooled and immediately subjected to the step (2).

Specifically, the step (1) in the method of producing the biodegradable resin composition according to the present invention can be carried out in a usual manner; for example, the biodegradable resin is melted with an extruder or the like, while the crystallization agent of the present invention and the plasticizer are mixed with the biodegradable resin. From the viewpoint of the dispersibility of the crystal nucleating agent and the plasticizer of the present invention, the temperature in the step (1) is the melting point (Tm) or more of the biodegradable resin, preferably in the range of Tm to Tm+100° C., more preferably in the range of Tm to Tm+50° C. For example, when the biodegradable resin is polylactic acid resin, the temperature in the step (1) is 170 to 240° C., more preferably 170 to 220° C.

In the method of producing the composition of the present invention, the step (2) can be carried out specifically in a usual manner, and mention is made of, for example, a method of thermally treating the biodegradable resin composition extruded through an extruder or the like or a method of thermally treating the biodegradable resin composition introduced through an injection-molding machine into a mold.

From the viewpoint of improving the rate of crystallization, the temperature in the step (2) is a temperature from the glass transition temperature (Tg) to less than Tm of the biodegradable resin composition, preferably in the range of Tg to Tg+100° C., more preferably in the range of Tg+10° C. to Tg+80° C., still more preferably in the range of Tg+20° C. to Tg+70° C. For the biodegradable resin composition wherein the biodegradable resin is for example polylactic acid resin, the temperature in the step (2) is preferably 50 to 120° C., more preferably 50 to 100° C., still more preferably 50 to 85° C.

The melting point (Tm) of the biodegradable resin is a value determined from endothermic peak temperature in crystal melting by a heating method in differential scanning calorimetry (DSC) based on JIS-K7121. The glass transition temperature (Tg) of the biodegradable resin composition is a value determined by a peak temperature of loss elastic modulus (E") in dynamic viscoelasticity measurement, and its value is a value determined by a method of measuring dynamic viscoelasticity described in the Examples.

EXAMPLES

The present invention is described in more detail by reference to the Examples below. The Examples are mere illustrative of the present invention and are not intended to limit the present invention.

The cold crystallization temperature, melt crystallization temperature, SP value and melting point of each of the crystal nucleating agents used in the Examples and Comparative Examples are shown in Table 1. The cold crystallization temperature (Tcc) and melt crystallization temperature (Tmc) of the crystal nucleating agent were determined by the following method.

<Method of Measuring the Cold Crystallization Temperature (Tcc) and the Melt Crystallization Temperature (Tmc)>

A composition containing 100 parts by weight of polylactic acid resin (LACEA H-400, SP value 21.5, Tm 166° C. Tg 62° C., manufactured by Mitsui hemicals, Inc.), 15 parts by weight of a plasticizer (POE (6) glycerin triacetate synthesized in Synthesis Example 1), and 1 part by weight of a crystal nucleating agent was kneaded in a Laboplasto Mill (manufactured by Toyo Seiki Seisaku-sho, Ltd.) at 180° C. for 10 minutes and then formed into a test piece of 0.5 mm in thickness by a press molding machine at 180° C. In press molding, a sheet formed was cooled in a noncrystal state (that is, under such a condition that the degree of crystallization as determined by wide-angle X-ray diffraction becomes 1% or less). The sheet was cut into fine pieces, and 15 mg of the pieces were weighed out on an aluminum pan and measured at increasing temperature at 8° C./min. from room temperature to 200° C. in a differential scanning calorimeter (DSC). In this measurement, an exothermic peak in cold crystallization was observed, and its peak temperature was determined as cold crystallization temperature (Tcc). Then, the sample was measured at decreasing temperature at 5° C./min. from 200° C. to room temperature. In this measurement, an exothermic peak in melt crystallization was observed, and its peak temperature was determined as melt crystallization temperature (Tmc).

TABLE 1

| | Crystal nucleating agent | Cold crystallization temperature (Tcc) | Melt crystallization temperature (Tmc) | SP value | Melting point (° C.) |
|---|---|---|---|---|---|
| A | 12-Hydroxystearic acid triglyceride | 59.0 | — | 9.8 | 86 |
| B | Behenic acid monoglyceride | 62.1 | — | 10.1 | 76 |
| C | Ethylenebis-12-hydroxtstearic acid amide | 60.5 | 108.8 | 10.4 | 142 |
| D | 12-hydroxystearic acid monoethanol amide | 61.6 | — | 10.4 | 98 |
| E | Ethylenebiscaprylic acid amide | 61.0 | — | 10.6 | 170 |
| K | Hexamethylenebis-12-hydroxystearic acid amide | 60.9 | 107.3 | 10.3 | 132 |
| F | Tripalmitin*[1] | 63.2 | — | 9.0 | 64 |
| G | Stearic acid monoamide*[2] | 70.7 | — | 9.9 | 103 |
| H | Ethylenebispalmitic acid amide | 71.5 | — | 9.7 | 149 |
| I | Gelol MD*[3] | 79.8 | — | 12.7 | 255 |
| J | Talc*[4] | 74.8 | — | — | — |
| L | m-Xylylenebis-12-hydroxystearic acid amide | — | 94.6 | 10.7 | 125 |

*[1]Tripalmitin: Palmitic acid triglyceride (reagent manufactured by Wako Pure Chemical Industries, Ltd.)
*[2]Stearic acid monoamide: Aliphatic Acid Amide S manufactured by Kao Corporation
*[3]Gelol MD: Bis(p-methylbenzylidene)sorbitol represented by the following general formula (X):
(X)

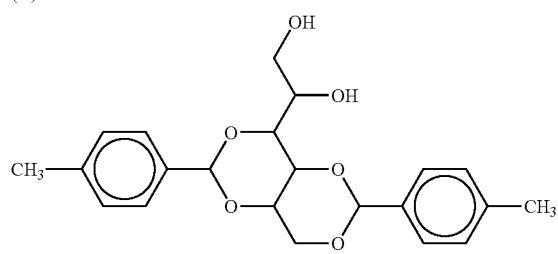

*[4]Talc: GS-2000 (average particle diameter D50: 1.0 μm) manufactured by Nippon Talc Co., Ltd.

Synthesis Example 1

Synthesis Example of Plasticizer

An autoclave was charged with cosmetic conc. glycerin (manufactured by Kao Corporation) and ethylene oxide in predetermined amounts (conc. glycerin/ethylene oxide molar ratio=1/6), and the mixture was reacted at 150° C. with 1 mol % KOH as a catalyst under a constant pressure of 0.3 MPa until the pressure became constant, followed by cooling to 80° C., to give a product with the non-neutralized catalyst. Kyoword 600S which was 8 times as high as weight of the catalyst was added as a catalyst adsorbent to the product and used to adsorb the catalyst at 80° C. for 1 hour in a nitrogen atmosphere under micro-pressure. The treated liquid was filtered to remove the adsorbent with a Nutze having Filter No. 2 pre-coated with Radio Light#900, to give glycerin ethylene oxide (6 moles) adduct (referred to hereinafter as POE (6) glycerin). The product was charged into a four-necked flask, heated to 105° C., stirred at 300 rpm, and then reacted with acetic anhydride dropped over about 1 hour in a predetermined amount of 3.6 moles per mole of POE (6) glycerin. After dropping was finished, the mixture was aged at 110° C. for 2 hours and further aged at 120° C. for 1 hour. After aging, the unreacted acetic anhydride and byproduct acetic acid were subjected to topping under reduced pressure and then to steaming to give POE (6) glycerin triacetate.

Synthesis Example 2

Synthesis Example of Plasticizer

A 1-L flask equipped with a stirrer, a thermometer and a dropping funnel was charged with 200 g PEG300 (average molecular weight of 300, manufactured by Kanto Chemical Co., Inc.) then 204 g acetic anhydride was added dropwise at 110° C. over 1 hour, and the mixture was aged at 120° C. for 2 hours. After the reaction was finished, the unreacted acetic anhydride and byproduct acetic acid were distilled away at 100° C./2.5 kPa and then the reaction mixture was subjected to steaming at 100° C./1.3 kPa to give an objective plasticizer polyethylene glycol diacetate (number of ethylene oxide units added on average: 6.4).

Examples 1 to 5, Comparative Examples 1 to 6

A biodegradable resin composition (Tg 11° C.) containing 100 parts by weight of polylactic acid resin (LACEA H-280, SP value 21.5, Tm 140° C., Tg 60° C., manufactured by Mitsui Chemicals, Inc.) as biodegradable resin, 25 parts by weight of POE (6) glycerin triacetate as a plasticizer, and a crystal nucleating agent whose type and amount are shown in Table 2 was kneaded in a Laboplasto Mill at 180° C. for 10 minutes and then formed into a test piece of 0.5 mm in thickness by a press molding machine at 180° C.

The transparency of the resulting test piece was measured by a method shown below. The resulting test piece was thermally treated by leaving it for 3 hours or 36 hours in an oven controlled at 60° C. The thermally treated test piece was evaluated for its flexibility, heat sensitivity, thermal resistance, transparency, resistance to bleeding, and degree of crystallization. These results are shown in Table 2.

<Transparency>

The haze of the test piece before and after thermal treatment was measured by using an integrating sphere light transmittance measuring device (haze meter) stipulated under JIS-K7105. A smaller number is indicative of higher transparency.

<Flexibility, Heat Sensitivity, Thermal Resistance>

The test piece after thermal treatment was measured for the temperature dependence of storage elastic modulus (E') in the temperature range of from −20° C. to 80° C. at a frequency of 50 Hz at increasing temperature of 2° C./min. with a dynamic viscoelasticity measuring device (DVA-200 manufactured by IT Keisoku Seigyo) and for its storage elastic modulus (E') at 0° C., 25° C. and 60° C., according to JIS-K 7198.

<Resistance to Bleeding>

The test piece (length 100 mm×width 100 mm×thickness 0.5 mm) after thermal treatment was left for 1 week in a thermostatic room at 40° C., and the occurrence of bleeding of the plasticizer on the surface of the test piece was observed with the naked eye.

<Degree of Crystallization>

The degree of crystallization of the test piece after thermal treatment was determined by analyzing its noncrystal and crystal peaks in the range of 2θ=5 to 50° by using a wide-angle X-ray diffractometer (RINT2500VPC, light source CuKα, tube voltage 40 kV, tube current 120 mA, manufactured by Rigaku Corporation).

TABLE 2

| | Crystal nucleating agent | | Transparency | | Flexibility/heat sensitivity/thermal resistance Storage elastic modulus E' (Pa) | | | Transparency | Resistance to bleeding | |
|---|---|---|---|---|---|---|---|---|---|---|
| | Type | Added amount (parts by weight) | Haze before thermal treatment (%) | Treatment time at 60° C. (H) | 0° C. | 25° C. | 60° C. | Haze after thermal treatment (%) | Surface state (presence or absence of bleeding) | Degree of crystallization (%) |
| Example 1 | A | 1 | 5.6 | 3 | 1.57E+09 | 3.16E+08 | 4.44E+07 | 9.5 | absence | 11.5 |
| | | | | 36 | 1.56E+09 | 3.16E+08 | 4.46E+07 | 14.0 | absence | 13.6 |
| Example 2 | B | 1 | 7.9 | 3 | 1.38E+09 | 2.59E+08 | 3.41E+07 | 20.0 | absence | 14.9 |
| | | | | 36 | 1.38E+09 | 2.60E+08 | 3.45E+07 | 18.7 | absence | 14.7 |
| Example 3 | C | 1 | 13.2 | 3 | 1.52E+09 | 3.08E+08 | 4.68E+07 | 17.7 | absence | 11.0 |
| | | | | 36 | 1.52E+09 | 3.09E+08 | 4.69E+07 | 19.0 | absence | 12.0 |
| Example 4 | D | 1 | 6.5 | 3 | 1.50E+09 | 3.20E+08 | 5.12E+07 | 11.8 | absence | 12.3 |
| | | | | 36 | 1.50E+09 | 3.12E+08 | 5.51E+07 | 11.9 | absence | 13.2 |

TABLE 2-continued

| | Crystal nucleating agent | | Transparency | | Flexibility/heat sensitivity/thermal resistance Storage elastic modulus E' (Pa) | | | Transparency | Resistance to bleeding | |
|---|---|---|---|---|---|---|---|---|---|---|
| | Type | Added amount (parts by weight) | Haze before thermal treatment (%) | Treatment time at 60° C. (H) | 0° C. | 25° C. | 60° C. | Haze after thermal treatment (%) | Surface state (presence or absence of bleeding) | Degree of crystallization (%) |
| Example 5 | E | 1 | 7.1 | 3 | 1.81E+09 | 3.59E+08 | 5.13E+07 | 18.5 | absence | 12.2 |
| | | | | 36 | 1.81E+09 | 3.60E+08 | 5.13E+07 | 18.9 | absence | 14.4 |
| Comparative example 1 | Not added | | 5.8 | 3 | 2.26E+09 | 3.11E+08 | 1.94E+06 | 6.5 | absence | 0.0 |
| | | | | 36 | 1.52E+09 | 2.75E+08 | 4.48E+07 | 53.5 | absence | 14.0 |
| Comparative example 2 | F | 1 | 16.7 | 3 | 1.60E+09 | 3.30E+08 | 5.11E+07 | 29.0 | absence | 12.3 |
| | | | | 36 | 1.59E+09 | 3.30E+08 | 5.15E+07 | 26.7 | absence | 13.4 |
| Comparative example 3 | G | 1 | 6.5 | 3 | 1.58E+09 | 2.98E+08 | 4.14E+07 | 27.5 | absence | 12.5 |
| | | | | 36 | 1.56E+09 | 3.60E+08 | 5.13E+07 | 25.0 | absence | 14.6 |
| Comparative example 4 | H | 1 | 19.9 | 3 | 1.62E+09 | 3.04E+08 | 4.82E+07 | 32.7 | absence | 8.5 |
| | | | | 36 | 1.61E+09 | 3.05E+08 | 4.82E+07 | 48.3 | absence | 15.0 |
| Comparative example 5 | I | 0.5 | 5.8 | 3 | 2.24E+09 | 2.66E+08 | 2.72E+06 | 7.6 | absence | 0.0 |
| | | | | 36 | 1.43E+09 | 3.77E+08 | 2.10E+07 | 48.4 | absence | 16.8 |
| Comparative example 6 | J | 1 | 35.2 | 3 | 1.94E+09 | 2.60E+08 | 2.66E+07 | 43.9 | absence | 6.2 |
| | | | | 36 | 1.54E+09 | 3.92E+08 | 2.23E+07 | 53.9 | absence | 16.8 |

Examples 6 to 8, Comparative Examples 7 to 8

A biodegradable resin composition (Tg 14° C.) containing 100 parts by weight of polylactic acid resin (blend of LACEA H-280/LACEA H-400=75/25 (parts by weight), SP value 21.5, Tm 165° C., Tg 62° C., manufactured by Mitsui Chemicals, Inc.) as biodegradable resin, 25 parts by weight of POE (6) glycerin triacetate as a plasticizer, and a crystal nucleating agent whose type and amount are shown in Table 3 was kneaded in a Laboplasto Mill at 180° C. for 10 minutes and then formed into a test piece of 0.5 mm in thickness by a press molding machine at 180° C.

The transparency of the resulting test piece was measured in the same manner as in Example 1. The resulting test piece was thermally treated by leaving it for 4 minutes or 36 hours in an oven controlled at 60° C. The thermally treated test piece was evaluated for its flexibility, heat sensitivity, thermal resistance, transparency, resistance to bleeding, and rate of crystallization in the same manner as in Example 1. These results are shown in Table 3.

Examples 9 to 11, Comparative Examples 9 to 10

A biodegradable resin composition (Tg 33° C.) containing 100 parts by weight of polylactic acid resin (LACEA H-400, SP value 21.5, Tm 166° C., Tg 62° C., manufactured by Mitsui Chemicals, Inc.) as biodegradable resin, 15 parts by weight of POE (6) glycerin triacetate as a plasticizer, and a crystal nucleating agent whose type and amount are shown in Table 4 was kneaded in a Laboplasto Mill at 180° C. for 10 minutes and then formed into a test piece of 0.5 mm in thickness by a press molding machine at 180° C.

The transparency of the resulting test piece was measured in the same manner as in Example 1. The resulting test piece was thermally treated by leaving it for 1 minute or 60 hours in an oven controlled at 60. The thermally treated test piece was evaluated for its flexibility, heat sensitivity, thermal resistance, transparency, resistance to bleeding, and degree of crystallization. These results are shown in Table 4.

TABLE 3

| | Crystal nucleating agent | | Transparency | | Flexibility/heat sensitivity/thermal resistance Storage elastic modulus E' (Pa) | | | Transparency | Resistance to bleeding | |
|---|---|---|---|---|---|---|---|---|---|---|
| | Type | Added amount (parts by weight) | Haze before thermal treatment (%) | Treatment time at 60° C. | 0° C. | 25° C. | 60° C. | Haze before thermal treatment (%) | Surface state (presence or absence of bleeding) | Degree of crystallization (%) |
| Example 6 | A | 1 | 4.6 | 4 minutes | 1.49E+09 | 3.44E+08 | 5.23E+07 | 5.9 | absence | 16.7 |
| | | | | 36 hours | 1.47E+09 | 3.44E+08 | 5.24E+07 | 8.5 | absence | 16.6 |
| Example 7 | B | 1 | 5.7 | 4 minutes | 1.45E+09 | 3.34E+08 | 5.03E+07 | 10.7 | absence | 15.9 |
| | | | | 36 hours | 1.45E+09 | 3.35E+08 | 5.05E+07 | 13.6 | absence | 16.4 |
| Example 8 | E | 1 | 6.7 | 4 minutes | 1.50E+09 | 3.44E+08 | 5.24E+07 | 12.4 | absence | 15.4 |
| | | | | 36 hours | 1.49E+09 | 3.44E+08 | 5.24E+07 | 12.6 | absence | 15.6 |
| Comparative example 7 | Not added | | 4.7 | 4 minutes | 2.28E+09 | 3.11E+08 | 1.94E+06 | 5.0 | absence | 0.0 |
| | | | | 36 hours | 1.28E+09 | 3.76E+08 | 7.52E+07 | 47.6 | absence | 19.3 |
| Comparative example 8 | F | 1 | 16.0 | 4 minutes | 1.46E+09 | 3.87E+08 | 5.57E+07 | 26.5 | absence | 17.9 |
| | | | | 36 hours | 1.47E+09 | 3.88E+08 | 5.57E+07 | 26.1 | absence | 15.5 |

TABLE 4

| | Crystal nuclating agent | | Transparency | | Flexibility/heat sensitivity/heat resistance Storage elastic modulus E' (Pa) | | | Transparency | Resistance to bleeding | |
|---|---|---|---|---|---|---|---|---|---|---|
| | Type | Added amount (parts by weight) | Haze before thermal treatment (%) | Treatment time at 60° C. | 0° C. | 25° C. | 60° C. | Haze after thermal treatment (%) | Surface state (presence or absence of bleeding) | Degree of crystallization (%) |
| Example 9 | A | 1 | 2.4 | 1 minute | 2.2E+09 | 1.3E+09 | 2.5E+08 | 2.6 | absence | 23.4 |
| | | | | 60 hours | 1.9E+09 | 1.3E+09 | 3.9E+08 | 6.7 | absence | 28.6 |
| Example 10 | B | 1 | 3.4 | 1 minute | 2.3E+09 | 1.4E+09 | 1.8E+08 | 3.8 | absence | 23.3 |
| | | | | 60 hours | 1.9E+09 | 1.3E+09 | 4.0E+08 | 10 | absence | 29.4 |
| Example 11 | E | 1 | 2.6 | 1 minute | 2.2E+09 | 1.2E+09 | 2.0E+08 | 4.2 | absence | 24.1 |
| | | | | 60 hours | 1.9E+09 | 1.3E+09 | 3.7E+08 | 4.6 | absence | 27.6 |
| Comparative example 9 | Not Added | | 3.4 | 1 minute | 2.5E+09 | 1.6E+09 | 5.8E+06 | 4.3 | absence | 2.7 |
| | | | | 60 hours | 2.1E+09 | 1.4E+09 | 4.5E+08 | 60 | absence | 33.4 |
| Comparative example 10 | G | 1 | 7.1 | 1 minute | 2.4E+09 | 1.6E+09 | 9.5E+06 | 7.1 | absence | 3.2 |
| | | | | 60 hours | 2.1E+09 | 1.4E+09 | 4.2E+08 | 25 | absence | 31.3 |

Examples 12 to 15, Comparative Examples 11 to 13

A biodegradable resin composition containing 100 parts by weight of polylactic acid resin (LACEA H-400, SP value 21.5, Tm 166° C., Tg 62° C., manufactured by Mitsui Chemicals, Inc.) as biodegradable polyester resin, 15 parts by weight of a plasticizer, that is, polyethylene glycol (6.4) diacetate (referred to hereinafter as plasticizer a) synthesized in Synthesis Example 2, a diester of succinic acid and triethylene glycol monomethyl ether (referred to hereinafter as plasticizer b), or a diester of adipic acid and diethylene glycol monomethyl ether (referred to hereinafter as plasticizer c), and a crystal nucleating agent whose type and amount are shown in Table 5 was kneaded in a Laboplasto Mill at 180° C. for 10 minutes and then formed into a test piece of 0.5 mm in thickness by a press molding machine at 180° C.

The transparency of the resulting test piece was measured in the same manner as in Example 1. The resulting test piece was thermally treated by leaving it for 1 minute in an oven controlled at 70° C. or for 60 hours in an oven controlled at 60° C. The thermally treated test piece was evaluated for its flexibility, heat sensitivity, thermal resistance, transparency, resistance to bleeding, and rate of crystallization. These results are shown in Table 5.

TABLE 5

| | Plasticizer | | Crystal nucleating agent | | | Transparency Haze before thermal treatment (%) | |
|---|---|---|---|---|---|---|---|
| | Type | Addition amount (parts by weight) | Type | Added amount (parts by weight) | Tg of composition (° C.) | | Heating temperature × treatment time |
| Example 12 | a | 15 | C | 0.5 | 34 | 2.3 | 70° C. × 1 minute |
| | | | | | | | 60° C. × 60 hours |
| Example 13 | a | 15 | K | 0.5 | 34 | 3.9 | 70° C. × 1 minute |
| | | | | | | | 60° C. × 60 hours |
| Example 14 | b | 15 | C | 0.5 | 35 | 1.6 | 70° C. × 1 minute |
| | | | | | | | 60° C. × 60 hours |
| Example 15 | c | 15 | C | 0.5 | 34 | 2.4 | 70° C. × 1 minute |
| | | | | | | | 60° C. × 60 hours |
| Comparative example 11 | a | 15 | Not added | | 34 | 2.9 | 70° C. × 1 minute |
| | | | | | | | 60° C. × 60 hours |
| Comparative example 12 | b | 15 | Not added | | 35 | 1.8 | 70° C. × 1 minute |
| | | | | | | | 60° C. × 60 hours |
| Comparative example 13 | c | 15 | Not added | | 34 | 1.8 | 70° C. × 1 minute |
| | | | | | | | 60° C. × 60 hours |

| | Flexibility/heat sensitivity/ thermal resistance Storage elastic modulus E' (Pa) | | | Transparency Haze after thermal treatment (%) | Resistance to bleeding Surface state (presence or absence of bleeding) | Degree of crystallization (%) |
|---|---|---|---|---|---|---|
| | 0° C. | 25° C. | 60° C. | | | |
| Example 12 | 2.1E+09 | 1.3E+09 | 2.8E+08 | 2.8 | absence | 21.5 |
| | 1.8E+09 | 1.3E+09 | 4.2E+08 | 7.9 | absence | 31.0 |
| Example 13 | 2.1E+09 | 1.3E+09 | 2.8E+08 | 4.6 | absence | 22.1 |
| | 1.8E+10 | 1.3E+09 | 4.2E+08 | 9.7 | absence | 30.5 |
| Example 14 | 2.1E+09 | 1.1E+09 | 3.0E+08 | 4.3 | absence | 24.3 |
| | 2.1E+09 | 1.1E+09 | 3.1E+08 | 6.8 | absence | 29.1 |

TABLE 5-continued

| | | | | | | |
|---|---|---|---|---|---|---|
| Example 15 | 2.1E+09 | 1.1E+09 | 3.0E+08 | 6.5 | absence | 30.4 |
| | 2.1E+09 | 1.1E+09 | 3.1E+08 | 7.6 | absence | 31.3 |
| Comparative example 11 | 2.0E+09 | 1.2E+09 | 1.3E+07 | 8.2 | absence | 10.0 |
| | 1.9E+09 | 1.3E+09 | 4.8E+08 | 28 | absence | 36.8 |
| Comparative example 12 | 2.5E+09 | 1.5E+09 | 4.3E+07 | 7.8 | absence | 16.1 |
| | 1.9E+09 | 1.3E+09 | 4.1E+08 | 30 | absence | 30.6 |
| Comparative example 13 | 2.5E+09 | 1.5E+09 | 4.3E+07 | 8.2 | absence | 15.1 |
| | 1.9E+09 | 1.3E+09 | 4.1E+08 | 57.1 | absence | 31.2 |

Examples 16 to 20, Comparative Examples 14 to 18

A biodegradable resin composition containing 100 parts by weight of polylactic acid resin (LACEA H-400, SP value 21.5, Tm 166° C., Tg 62° C., manufactured by Mitsui Chemicals, Inc.) as biodegradable polyester resin, 15 parts by weight of POE (6) glycerin triacetate (referred to hereinafter as plasticizer d) synthesized as a plasticizer in Synthesis Example 1, the plasticizer a, the plasticizer b, or tributyl acetyl citrate (manufactured by Taoka Kagaku Kogyo Co., Ltd.; referred to hereinafter as plasticizer e), and a crystal nucleating agent whose type and amount are shown in Table 6 was kneaded in a Laboplasto Mill at 180° C. for 10 minutes and then formed into a test piece of 0.5 mm in thickness by a press molding machine at 180° C.

The test piece was melted again at 190° C. by a manual injection molding machine manufactured by Shinko Sellbic Co., Ltd., then injected into a mold at 80° C. and kept therein until crystallization was finished, to prepare a test piece of 60 mm in length, 10 mm in thickness and 2 mm in width. The time in which the crystallization had been finished was regarded as retention time.

After the crystallization was finished, the test piece was evaluated for its releasability from the mold under the following criteria, and the degree of crystallization was determined by the same method as in Example 1. The resulting test piece was evaluated for its impact resistance by an Izod impact tester manufactured by Toyo Seiki Seisaku-sho, Ltd. according to JIS K7110. The results are shown in Table 6.

Example 21, Comparative Example 19

A biodegradable resin composition (Tg 42° C.) containing 100 parts by weight of polylactic acid resin (LACEA H-400, SP value 21.5, Tm 166° C., Tg 62° C., manufactured by Mitsui Chemicals, Inc.) as biodegradable polyester resin, 10 parts by weight of the plasticizer d as a plasticizer, a crystal nucleating agent whose type and amount are shown in Table 7, and 0.5 part by weight of a hydrolysis inhibitor (Carbodilite LA-1, manufactured by Nisshinbo Industries, Inc.) was kneaded in a Laboplasto Mill at 180° C. for 10 minutes and then formed into a test piece of 0.5 mm in thickness by a press molding machine at 180° C.

The test piece was melted again at 200° C. by a manual injection molding machine manufactured by Shinko Sellbic Co., Ltd., then injected into a mold at 80° C. and kept therein until crystallization was finished, to prepare a test piece of 60 mm in length, 10 mm in thickness and 2 mm in width. The time in which the crystallization had been finished was regarded as retention time.

After the crystallization was finished, the test piece was evaluated for its releasability from the mold, degree of crystallization and impact resistance in the same manner as in Examples 16 to 20. The results are shown in Table 7.

TABLE 6

| | Plasticizer | | Crystal nucleating agent | | Tg of composition (° C.) | Melting temperature (° C.) | Mold temperature (° C.) | Retention time (second) | Releasability | Degree of crystallization (%) | Impact resistance * (kJ/m$^2$) |
|---|---|---|---|---|---|---|---|---|---|---|---|
| | Kind | Addition amount (parts by weight) | Kind | Added amount (parts by weight) | | | | | | | |
| Example 16 | d | 15 | C | 0.5 | 33 | 190 | 80 | 15 | ◯ | 30.8 | NB |
| Example 17 | d | 15 | K | 0.5 | 33 | 190 | 80 | 15 | ◯ | 32.0 | NB |
| Example 18 | a | 15 | C | 0.5 | 34 | 190 | 80 | 15 | ◯ | 31.3 | NB |
| Example 19 | a | 15 | K | 0.5 | 34 | 190 | 80 | 15 | ◯ | 33.4 | NB |
| Example 20 | b | 15 | C | 0.5 | 35 | 190 | 80 | 15 | ◯ | 30.0 | NB |
| Comparative example 14 | d | 15 | Not added | | 33 | 190 | 80 | 120 | Δ~X | 31.1 | NB |
| Comparative example 15 | d | 15 | I | 0.5 | 33 | 190 | 80 | 120 | Δ~X | 32.2 | NB |
| Comparative example 16 | Not added | | L | 0.5 | 62 | 190 | 80 | 600 | ◯ | 28.6 | 2.2 |
| Comparative example 17 | a | 15 | L | 0.5 | 34 | 190 | 80 | 30 | ◯ | 31.6 | NB |
| Comparative example 18 | e | 1 | L | 0.5 | 43 | 190 | 80 | 300 | ◯ | 29.9 | 2.2 |

* NB: Not broken

TABLE 7

| | Crystal nucleating agent | | Melting temperature (° C.) | Mold temperature (° C.) | Retention time (second) | Releasability | Degree of crystllization (%) | Impact resistance * (kJ/m²) |
|---|---|---|---|---|---|---|---|---|
| | Kind | Added amount (parts by weight) | | | | | | |
| Example 21 | C | 0.5 | 200 | 80 | 15 | ◯ | 34.1 | NB |
| Comparative example 19 | | Not added | 200 | 80 | 120 | Δ~X | 33.0 | NB |

* NB: Not broken

The invention claimed is:

1. A method of producing a biodegradable resin composition, comprising:

mixing a biodegradable resin, a plasticizer, and a crystal nucleating agent, which is an aliphatic compound having two or more groups of at least one group selected from the group consisting of an ester group, a hydroxyl group, and an amide group, at the melting point (Tm) of the biodegradable resin or higher, and thermally treating the resulting mixture at a temperature of from the glass transition temperature (Tg) of the biodegradable resin to a temperature lower than Tm of the biodegradable resin, thereby producing the biodegradable resin composition, wherein the plasticizer is at least one plasticizer selected from the group consisting of a glycerin ethylene oxide-added acetate, an ester of succinic acid and triethylene glycol monomethyl ether, an ester of adipic acid and diethylene glycol monomethyl ether, and an ester of 1,3,6-hexatricarboxylic acid and butyl diglycol, and wherein the crystal nucleating agent is at least one agent selected from the group consisting of ethylenebis-12-hydroxystearic acid amide and hexamethylenebis-12-hydroxystearic acid amide.

2. The method of producing a biodegradable resin composition according to claim 1, wherein a content of the plasticizer is from 7 to 70 parts by weight and a content of the crystal nucleating agent is from 0.1 to 5 parts by weight, based on 100 parts by weight of the biodegradable resin.

3. The method of producing a biodegradable resin composition according to claim 1, wherein the temperature of the thermal treating is from 50 to 85° C.

4. A biodegradable resin composition comprising a biodegradable resin, a plasticizer, and a crystal nucleating agent, wherein the crystal nucleating agent is at least one agent selected from the group ethylenebis-12-hydroxystearic acid amide and hexamethylenebis-12-hydroxystearic acid amide, and the biodegradable resin composition satisfies the following conditions (i), (ii) and (iii):

(i) the haze of the composition having a thickness of 0.5 mm after a thermal treatment at 60° C. for 36 or 60 hours is 20% or less;

(ii) the storage elastic modulus (E') at a temperature of 25° C. and a frequency of 50 Hz is $1 \times 10^8$ to $2 \times 10^9$ Pa; and (iii) the storage elastic modulus (E') at a temperature of 60° C. and a frequency of 50 Hz is $1 \times 10^7$ to $1 \times 10^9$ Pa, wherein the plasticizer is at least one plasticizer selected from the group consisting of a glycerin ethylene oxide-added acetate, an ester of succinic acid and triethylene glycol monomethyl ether, an ester of adipic acid and diethylene glycol monomethyl ether, and an ester of 1,3,6-hexatricarboxylic acid and butyl diglycol.

5. The biodegradable resin composition according to claim 4, wherein a content of the plasticizer is from 7 to 70 parts by weight and a content of the crystal nucleating agent is from 0.1 to 5 parts by weight, based on 100 parts by weight of the biodegradable resin.

6. The biodegradable resin composition according to claim 4, wherein the crystal nucleating agent is a compound by which a cold crystallization temperature (Tcc) of the biodegradable resin composition can be made 65° C. or lower, wherein the cold crystallization temperature (Tcc) is defined as a peak temperature in the cold crystallization determined by measuring, by a differential scanning calorimeter at an increasing temperature at 8° C./min. from a room temperature to 200° C., a biodegradable resin composition obtained in a noncrystal state, wherein the noncrystal state is obtained (i) under such a condition that a degree of crystallization as determined by a wide-angle X-ray diffraction becomes 1% or less and (ii) by cooling a mixture consisting of 100 parts by weight of a polylactic acid resin of 95% or more L-lactic acid purity as the biodegradable resin, 15 parts by weight of polyoxyethylene glycerin triacetate, wherein the number of ethylene oxide units on average is 6, as the plasticizer, and 1 part by weight of the crystal nucleating agent, at the melting point (Tm) of the biodegradable resin or greater.

7. The biodegradable resin composition according to claim 4, wherein the biodegradable resin is a polylactic acid resin.

* * * * *

UNITED STATES PATENT AND TRADEMARK OFFICE
CERTIFICATE OF CORRECTION

| | |
|---|---|
| PATENT NO. | : 7,652,085 B2 |
| APPLICATION NO. | : 11/596294 |
| DATED | : January 26, 2010 |
| INVENTOR(S) | : Takenaka et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 354 days.

Signed and Sealed this

Twenty-third Day of November, 2010

David J. Kappos
*Director of the United States Patent and Trademark Office*